Sept. 18, 1962  H. J. MILLER ETAL  3,054,633
QUICK RELEASE FASTENING APPARATUS
Original Filed Sept. 28, 1956  2 Sheets-Sheet 1

INVENTORS
HERBERT J. MILLER
MICHAEL M. BEHLES
JAMES B. CLARK

BY R. J. Tompkins

ATTORNEY

Sept. 18, 1962    H. J. MILLER ETAL    3,054,633
QUICK RELEASE FASTENING APPARATUS
Original Filed Sept. 28, 1956    2 Sheets-Sheet 2
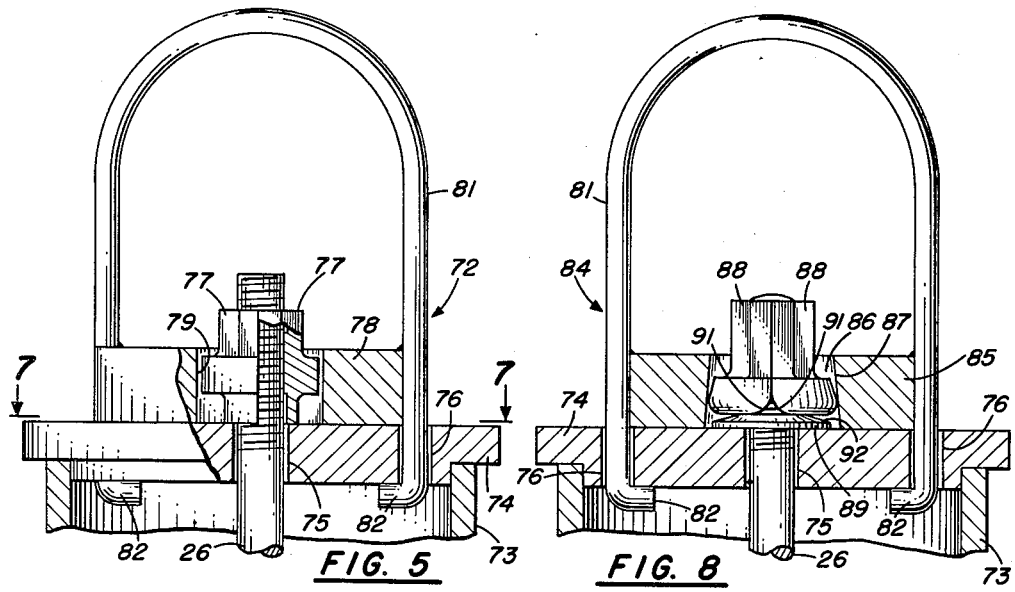
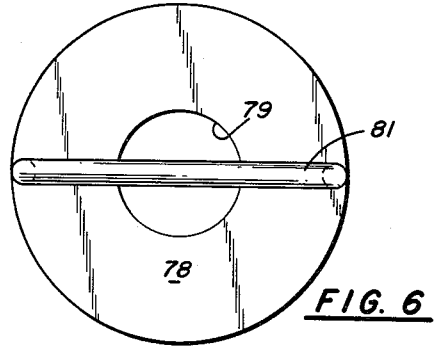
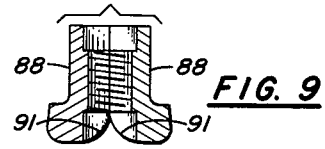
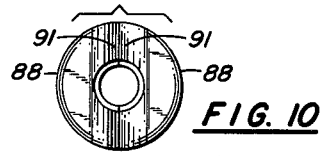
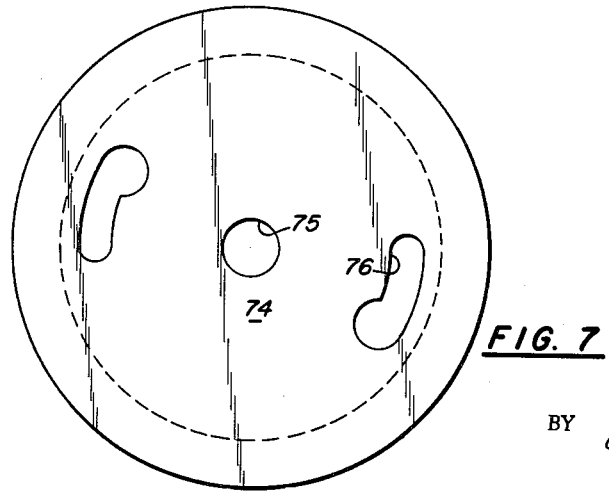
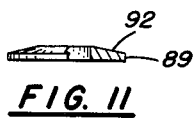
INVENTORS
HERBERT J. MILLER
MICHAEL M. BEHLES
JAMES B. CLARK
BY R. J. Tompkins
ATTORNEY United States Patent Office 3,054,633
Patented Sept. 18, 1962

3,054,633
QUICK RELEASE FASTENING APPARATUS
Herbert J. Miller, Fullerton, Michael M. Behles, Baltimore, and James B. Clark, Monkton, Md., assignors, by mesne assignments, to the United States of America as represented by the Secretary of the Navy
Original application Sept. 28, 1956, Ser. No. 612,903, now Patent No. 2,904,366, dated Sept. 15, 1959. Divided and this application July 30, 1959, Ser. No. 830,688
5 Claims. (Cl. 292—300)

This application is a division of application Serial No. 612,903, filed September 28, 1956, for Quick Release Fastening Apparatus, issued as Patent No. 2,904,366, date September 15, 1959.

This invention relates to quick release fastening apparatus and more particularly to a fastening apparatus having two identical members adapted to mate together to form an opening for receiving and securely holding the end of a rod, or the like, that is to be releasably held.

There are known fastening apparatus that can be quickly disconnected but do not provide a rigid attachment or, if a rigid attachment is provided, then the fastener cannot be quickly disconnected. Thus, the known fastening apparatus do not adequately provide for a quick disconnect and a rigid attachment in the same structure.

In the present invention, the fastening apparatus has two identical members which are mated together to form an opening for receiving and holding the end of a connecting rod, or the like, that is to be releasably held. There is further provided means which are adapted to maintain the two members in mating position when the connecting rod is being held or is adapted to release the two members from mating position and from engagement with the connecting rod thereby allowing the rod to fall free of the fastener. The connecting rod is under a constant tension load that tends to pull the rod out of engagement with the fastener unless the two mating members are in mating position to securely hold the rod. Therefore, an axially split fastener is provided that affords a rigid attachment which can be quickly disconnected without sacrificing the efficiency of the rigid attachment as in known constructions.

An object of the present invention is the provision of a fastener which provides a secure attachment while still being adapted to be quickly disconnected in case of emergency.

A further object of the invention is the provision of a fastener which is simple in construction, has a minimum number of parts and costs very little to produce.

Yet another object of the present invention is a split fastener holding a rod under a constant tension which will assist in releasing the rod from the split fastener when the fastener is allowed to separate.

Other objects and many of the attendant advantages of this invention will be readily appreciated as the same becomes better understood by reference to the following detailed description when considered in connection with the accompanying drawings wherein:

FIG. 5 is a side elevation, partly in section, of another embodiment of the fastener device.

FIG. 6 is a plan view of the handle shown in FIG. 5.

FIG. 7 is a section taken on the line 7—7 of FIG. 5.

FIG. 8 illustrates another embodiment of the fastener device.

FIG. 9 is a side elevation in section of the split nut shown in FIG. 8.

FIG. 10 is an underside view of the split nut shown in FIG. 9.

FIG. 11 shows a side elevation, partly in section, of the washer shown in FIG. 8.

Figure 1:
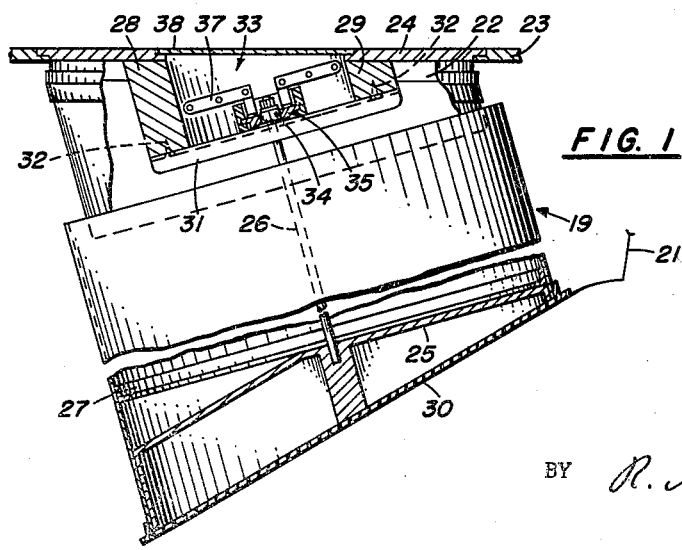
FIG. 1 shows a side elevation, partly in section, of one embodiment of the present invention which illustrates how the fastener is mounted in an escape chute of a seaplane.

Referring now to the drawings, wherein like reference characters designate like or corresponding parts throughout the several views, there is shown in FIG. 1 a personnel escape chute 19 mounted in a seaplane hull 21. The upper end of the escape chute 19 is in line with and extends into an opening 22 in the floor 23 of the seaplane. An upper hatch or door 24 closes the opening 22 when the personnel escape chute is not in use. The lower end of the escape chute is closed by a lower hatch or door 25 having a pressure and water seal 30 connected thereto and conforming to the outline of the hull 21 of the seaplane. A connecting rod 26 is secured at its lower end to the lower hatch 25 and extends upwardly through the escape chute 19. Secured to the underside of the upper hatch 24 are two downwardly extending struts 28 and 29, made of a suitable material such as metal or wood, connected together by a metal plate 31 with screws 32 or any other equivalent means. Mounted on the plate 31 is a split screw-threaded fastener, generally indicated as 33, which engages the upper screw-threaded end of the rod 26. It can be readily seen that due to the weight of the lower hatch or door 25 as well as preloading of rod 26 and/or pressure asserted on door 25, a constant tension load is placed on the rod 26. This tension load assists in operating the split screw-threaded fastener 33. It will be understood that other types of fasteners, to be described hereinbelow, may be used instead of fastener 33.

The split fastener 33 has two identical screw-threaded members 34 which are held in position by a collar 35 that prevents the split fastener from separating under the tension load. In the event of an emergency, removal of the restraining collar allows the tension load to act and cause the two identical members to release their grip on the screw-threaded end of the rod 26.

In the embodiment of the fastener 33 shown in FIG. 1, the handle 37 is rotated to release the split fastener. An access opening in the upper hatch or door 24 is closed by an auxiliary door 38.

In case of an emergency, the operation of the assembly of FIG. 1 to provide an emergency escape passage for personnel is as follows: the auxiliary door 38 is opened and the handle 37 is rotated thereby removing the restraining collar 35 from the members 34; the rod 26 is then disengaged from the member 34 and falls downwardly due to the tension load caused by the weight of the lower hatch 25. The lower end of the escape chute is now clear. The upper end of the escape chute is cleared by lifting the upper hatch 24 upwardly carrying therewith the struts 28 and 29, the plate 31 and the split fastener 33.

It is to be understood that any of the following described embodiments can be substituted for the fastener device 33, shown in FIG. 1 to perform the same function.

Figure 3:
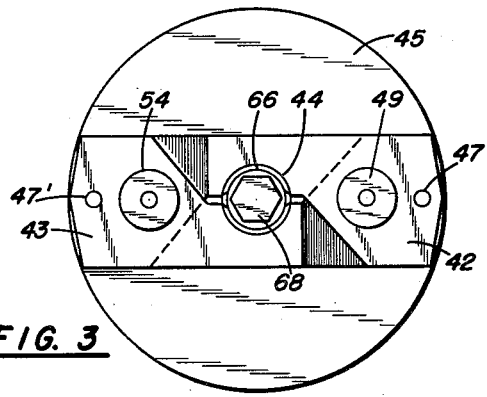
FIG. 3 shows a section of the fastener device taken on the line 3—3 of FIG. 2.
Figure 2:
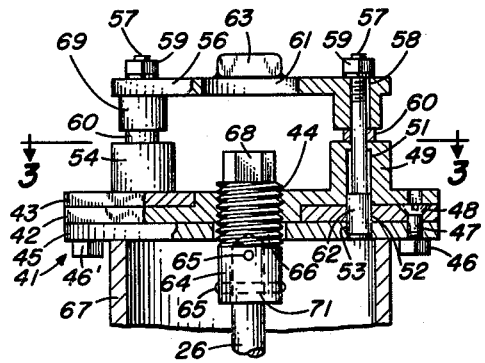
FIG. 2 illustrates a side elevation, partly in vertical section of another embodiment of the invention.

Referring to FIG. 2, an embodiment of the split fastener is generally indicated as 41, having split plates 42 and 43, Z-shaped in cross-section and U-shaped in plan view, mating together to form a screw-threaded opening 44. As best seen in FIG. 3, 180° of the opening 44 is formed by the U-shaped split plate 42 while the other 180° of the opening is formed by the U-shaped split plate 43. Split plate 43 is pivotally connected at one end to a cover 45 by any suitable fastening means, such as the nut 46 and bolt 47 which passes through hole 48 in plate 43.

The hole 48 is countersunk to allow the head of bolt 47 to be flush with the upper surface of plate 43. Split plate 42 is similarly connected to the diametrically opposite part of the cover 45 by a bolt 47' and a nut 46'. On the end of plate 42 that is remote from bolt 47', a boss 49 is provided having an opening 51 therethrough which is directly in line with openings 52 and 53 in plate 43 and cover 45, respectively. Split plate 43 has a similar boss 54 on the end thereof remote from bolt 47. Although not shown, the boss 54 has an opening similar to opening 51 of boss 49 which is in line with openings in plate 42 and cover 45 similar to openings 52 and 53.

Figure 4:
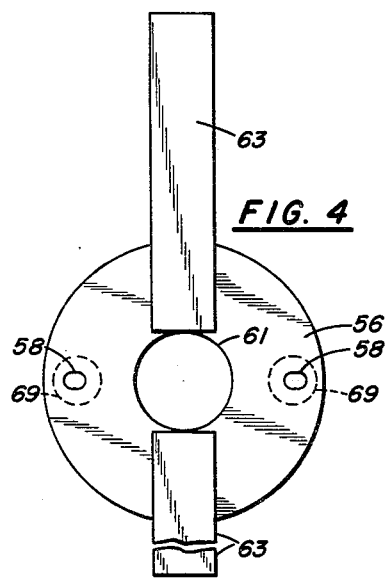
FIG. 4 is a plan view of the handle shown in FIG. 2.

A circular plate 56 (see FIG. 4) has a handle 63 connected thereto and a central hole 61 therein. Extending downwardly from plate 56 are a pair of oppositely disposed lugs 69; slotted openings 58 extend through plate 56 and lugs 69, as is further shown in FIG. 2. A pair of pins 57 having their upper ends threaded are fastened into the slotted openings 58 in plate 56 by upper nuts 59 and lower nuts 60.

The lower end 62 of each pin 57 is enlarged and is received in openings 51, 52, and 53.

The upper end of connecting rod 26 is received in a bore 71 of a connecting member 64, and is held therein as by pins 65. Connecting member 64 has external threads 66 thereon, which are engaged by the threads of opening 44 formed by the two split plates 42 and 43. A hexagonal head 68 is provided on the upper end of connecting member 64. A sleeve 67 is attached to the underside of cover 45 to support the split fastener 41. When embodiment 41 is employed in the organization disclcosed in FIG. 1, it would of course be attached to plate 31.

In the operation of the split fastener 41, the handle 63 is grasped and pulled upwardly, thereby lifting the lower enlarged ends 62 of the pins 57 upwardly into openings 51 of bosses 49 and 54 and allowing the lower ends 62 of pins 57 to clear the split plates 42 and 43. The handle 63 is then turned a small amount in a counter-clockwise direction, as seen from above in FIG. 2. Due to the pins 57 acting on the bosses 49, 54 of plates 42, 43, respectively, these plates will be caused to rotate slightly in a counterclockwise direction about bolts 47, 47', respectively, the movement being permitted by the slotted openings 58 in plate 56 and lugs 69, and being sufficient to free the threads 66 on connecting member 64 from engagement with the threads of opening 44 of plates 42, 43.

In resetting the split fastener to hold another connecting rod, a tighter connection and greater tension between the fastener and the rod 26 can be obtained by engaging the hexagonal head 68 with a proper tool through the opening 61 in plate 56.

In FIG. 5 there is shown another embodiment of the present invention wherein the split fastener is generally indicated as 72 and is supported on a sleeve 73. When embodiment 72 is employed in the organization according to FIG. 1, it would of course be connected to plate 31. Circular plate 74 is fastened to sleeve 73 and has a centrally located opening 75 and two oppositely disposed bayonet openings 76 therein (FIG. 7). A connecting rod 26 having a screw-threaded upper end passes through the opening 75 and is threadedly engaged by two identical screw-threaded split nut members 77. A collar 78 having an opening 79 therein surrounds the split nut members 77 and maintains the members 77 in threaded engagement with the rod 26. A U-shaped handle 81 carries the collar 78 spaced from inwardly turned ends 82 of the handle. The bayonet openings 76 in plate 74 receive the ends 82 of the handle 81 to provide a releasable connection for the collar 78 and the split nut members 77.

In case of an emergency the operation of the fastener 72 is very simple. The handle 81 is given a twist in a clockwise direction which lines up the ends 82 of handle 81 with the large part of the bayonet openings 76. The handle 81 is then pulled upwardly, carrying the collar 78 with it and thereby releasing the restraining support on the split nut 77; the constant tension load from connecting rod 26 will then cause the split nut 77 to fall away from threaded engagement with the rod 26 and the connection is thereby released.

Referring to FIG. 8, another embodiment of the split nut fastener is generally indicated as 84. The handle 81 having the inwardly turned ends 82 which are adapted to lockingly engage the bayonet openings 76 in the circular plate 74 are the same as the corresponding elements in the fastener 72 of FIG. 5. The rod 26 is threadedly engaged and held by screw-threaded split nut members 88 which are identical in function to split nut members 77, of fastener 72. The members 88 have beveled surfaces 91 that are supported on a washer 89 having a corresponding beveled surface 92. As best seen in FIG. 9, the split nut members 88 only have screw-threads in the central portion of the nut whereas both ends of the members are plain. The handle 81 carries a collar 85 which has an opening 86 therethrough, having side walls 87 that are tapered upwardly, as shown, and which serve to prevent the undesired opening of the sides of the split nut 88. The walls 87 are tapered to minimize the friction that must be overcome when collar 85 is being removed.

The split fastener 84 operates in the same manner as described for the split fastener 72, except that a camming action is obtained between the split nut members 88 and the washer 89 due to the beveled surfaces 91 and 92.

Obviously many modifications and variations of the present invention are possible in the light of the above teachings. It is therefore to be understood that within the scope of the appended claims the invention may be practiced otherwise than as specifically described.

What is claimed is:

1. A quick release apparatus for release of an escape chute door comprising a chute and a door thereon, a connecting rod secured at one end thereof to said door and having the other end screw threaded, a supporting means mounted in said chute and having an opening therethrough, the threaded end of said rod passing through said opening, a screw threaded split nut threadedly engaging the threaded end of said rod, collar means releasably attached to said supporting means and surrounding said split nut to prevent separation thereof, and quick releasing means operatively connected to said collar means for withdrawing said collar means to permit separation of said nut to release said rod.

2. A quick release fastening apparatus comprising a connecting rod to be supported and released having a tension load thereon, a supporting means having a central opening and oppositely positioned bayonet openings therethrough, one end of said connecting rod being threaded and passing through said central opening, a split nut securely engaging the end of the rod passing through the supporting means, a collar having a central opening restrainingly surrounding said split nut, a handle secured to said collar and having bent over ends that are lockingly received in the bayonet openings in said supporting means, whereby when the bent over ends of the handle are disengaged from the bayonet slots, the handle and collar are pulled away from the split nut, thus allowing the split nut to separate from the connecting rod.

3. The combination as set forth in claim 2 and a washer having an upper surface positioned between the split nut and the supporting means, said split nut having beveled surfaces in engagement with the upper surface on the washer, whereby a camming action between the split nut and the washer will be obtained.

4. The combination as set forth in claim 2 and said central opening in said collar being tapered upwardly thereby providing a camming action when the walls defining the tapered central opening restrainingly engages the split nut in the mating position.

5. A quick release fastening apparatus comprising a connecting rod to be supported and released while having a tension load thereon, a supporting means having an opening therethrough, one end of said connecting rod having threads thereon and passing through said opening, a longitudinally split nut in mating position with and securely engaging the threaded end of the rod passing through said opening, a pair of inter-engaging locking members urging said split nut into intimate contact with said connecting rod, one of said inter-engaging locking members is formed by a handle having a pair of inwardly turned ends and a collar having a centrally located bore securely fastened to said handle, the other of said inter-engaging locking members being formed by a circular plate which is provided with a pair of bayonet openings for releasably receiving said inwardly turned ends of said other inter-engaging member, said inter-engaging locking members cooperating to restrain the separation of said split nut whereby rotation of said one inter-engaging locking member with respect to said other member permits said longitudinally split nut to separate and thereby release said connecting rod.

References Cited in the file of this patent

UNITED STATES PATENTS

| | | |
|---|---|---|
| 747,270 | Taylor | Dec. 15, 1903 |
| 1,005,227 | Jones | Oct. 10, 1911 |
| 1,025,377 | Craig | May 7, 1912 |
| 2,328,669 | Nicholson | Sept. 7, 1943 |
| 2,455,157 | Bigelow | Nov. 30, 1948 |

FOREIGN PATENTS

| | | |
|---|---|---|
| 21,856 | Great Britain | Oct. 17, 1898 |
| 141,948 | Sweden | Sept. 1, 1953 |